United States Patent [19]

Wolf et al.

[11] Patent Number: 4,552,543
[45] Date of Patent: Nov. 12, 1985

[54] TORSIONALLY ELASTIC COUPLING WITH AN IMPROVED CHARACTERISTIC CURVE

[75] Inventors: Franz J. Wolf; Hubert Pletsch, both of Bad Soden-Salmünster, Fed. Rep. of Germany

[73] Assignee: WOCO Franz-Josef Wolf & Co., Fed. Rep. of Germany

[21] Appl. No.: 649,287

[22] Filed: Sep. 11, 1984

[30] Foreign Application Priority Data

Sep. 14, 1983 [EP] European Pat. Off. ........ 83109087.3

[51] Int. Cl.⁴ .......................... F16D 3/76; F16D 13/64
[52] U.S. Cl. ..................................... 464/83; 192/106.1
[58] Field of Search ................. 192/55, 106.1; 464/83, 464/85, 87, 89

[56] References Cited

U.S. PATENT DOCUMENTS

| 1,640,788 | 8/1927 | Masury | 464/83 X |
| 1,641,230 | 9/1927 | Manville | 464/83 X |
| 3,148,756 | 9/1964 | Romanini | 192/106.1 |
| 4,249,396 | 2/1981 | Ziegler | 464/83 |
| 4,252,227 | 2/1981 | Staub, Jr. | 464/83 X |
| 4,291,790 | 9/1981 | Staub, Jr. | 192/106.1 X |
| 4,300,363 | 11/1981 | Mathues | 464/87 X |

FOREIGN PATENT DOCUMENTS

| 112960 | 7/1984 | European Pat. Off. . |
| 2212468 | 10/1973 | Fed. Rep. of Germany ... 192/106.1 |
| 2097099 | 10/1982 | United Kingdom . |

Primary Examiner—Stuart S. Levy
Assistant Examiner—Daniel P. Stodola
Attorney, Agent, or Firm—Lowe, King, Price & Becker

[57] ABSTRACT

A torsionally elastic coupling includes a pair of load first and second coupling plates capable of twisting relative to each other by means of a motion-changing link connected to one of the plates, a coupling link connected to the motion-changing link and a spring link coupled to the coupling link. The coupling link is connected to a bearing plate which, when the first and second coupling plates are twisted with respect to one another, is pulled radially inward to act upon the spring link so that a high degree of softness in twisting is achieved by the bearing plate acting as a centrifugal weight.

11 Claims, 3 Drawing Figures

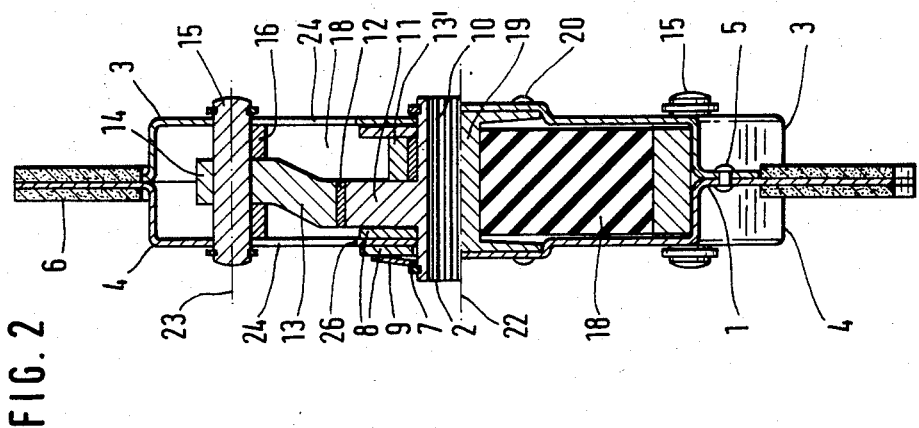
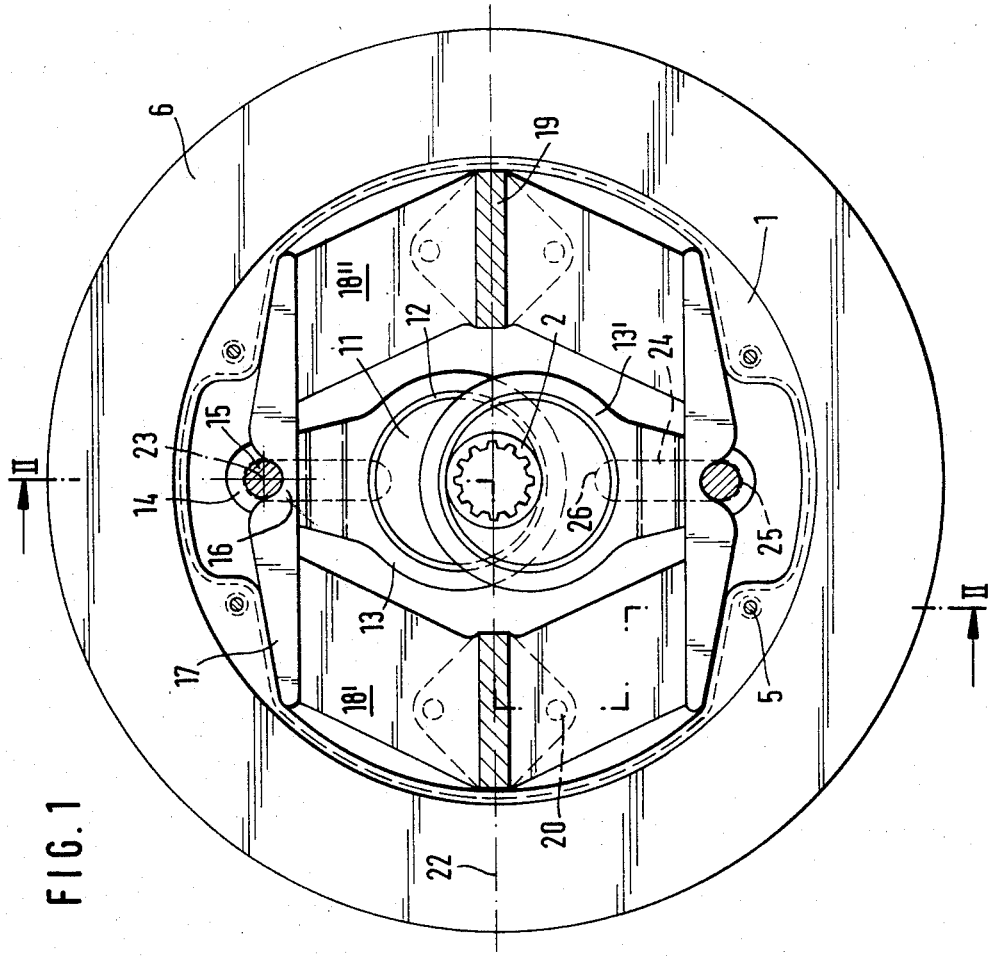

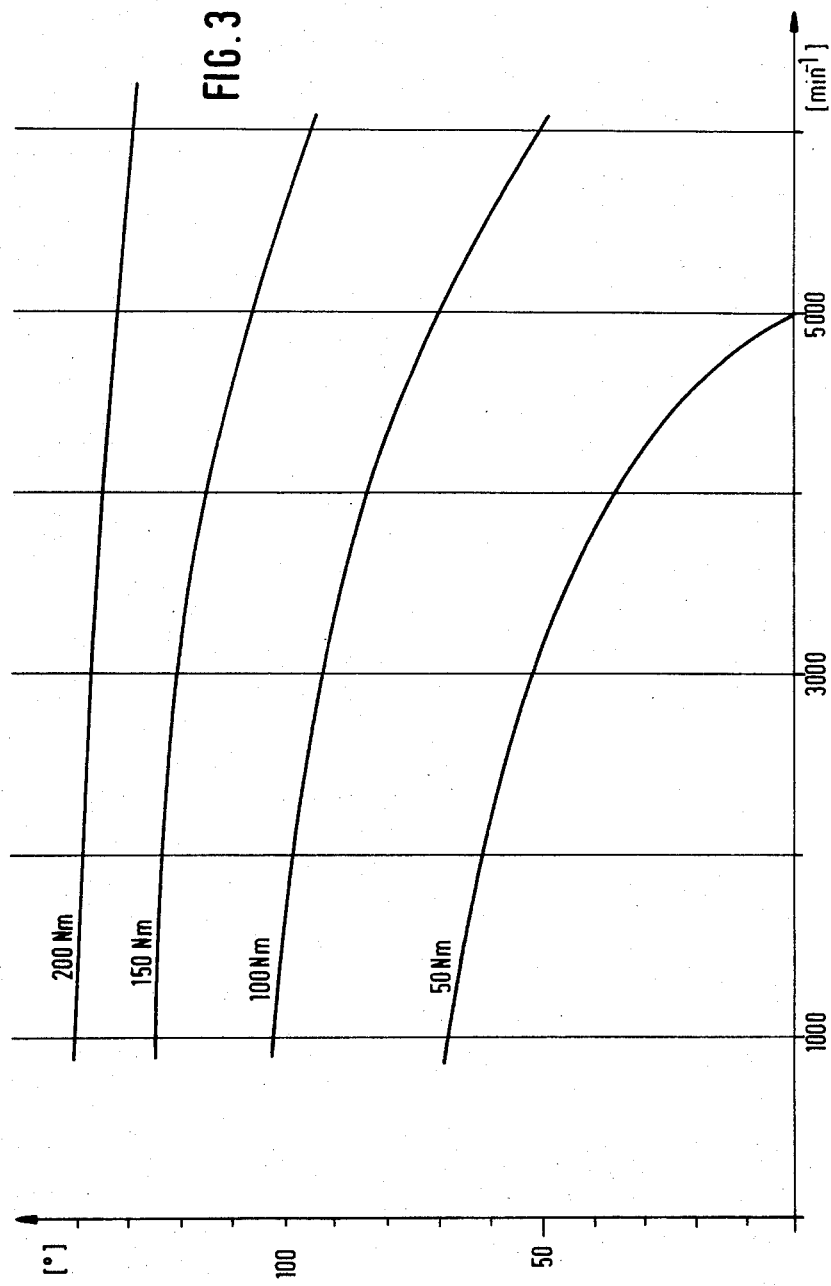

TORSIONALLY ELASTIC COUPLING WITH AN IMPROVED CHARACTERISTIC CURVE

BACKGROUND OF THE INVENTION

The present invention relates to a torsionally elastic coupling wherein two halves of the coupling are twistable with respect to one another through at least one spring link to transmit torque, between the halves and through the coupling in series with said spring link. At least one motion-changing link connecting the two halves to each other and to the spring link is capable of changing rotational movement to translational movement, or vice versa, to transmit force through at least one bearing plate that radially on the outside rests on at least one spring link and that radially on the inside is supported in a force-locking manner in connection with a first of the two halves of the coupling. The motion-changing link, directly or through at least one translating coupling link, is coupled in such a way that the bearing plate at the time of twisting of the second half of the coupling relative to the first half starting from the zero position, is acted upon at least essentially radially to tighten or relax the spring link. The second half of the coupling rotates and is firmly connected with the motion-changing link.

A coupling of this type is part of the state of the art according to European Patent Application EP No. 83 103 977.1 belonging to the same assignee that has not been previously published. In order to avoid repetition, it is stated here explicitly that this European patent application, as a whole, is part of the scope of the original disclosure of the present application.

The characteristic torque twisting angle curve of the coupling of the state of the art is characterized in that, corresponding to the increasing restoring force, it progressively rises more or less softly with the increasing deflection of the spring link when the applied effort, i.e., the torque, is increased. This progressive rise, when elastomer spring assemblies are used as the spring link, increases even more with an increasing torque. In other words, in the range of higher and maximum on-load torques, only a small additional twisting angle is available for an indicated increase in load when the overall twisting angle of the torsionally elastic coupling is large. Therefore, impacts of load changes are absorbed only moderately, especially in the critical range of high torques. Thus, with a torsionally elastic coupling designed for a special range according to the state of the art, in the mean available twisting angle range and torque range a load change of, for example, 10 Nm can be absorbed by a twisting of the torsionally elastic coupling by 10°, but at higher values of torque the same amount of load change of 10 Nm would be absorbed over a twisting angle of, for example, only 2° or 3°. This is called a hardening of the characteristic torque/twisting angle curve. Such a hardening of the characteristic torque/twisting angle curve is undesirable, especially in the range of high torques, since any system, such as the drive line of a motor vehicle, in the range of relatively high torques is very stressed anyhow. At higher values of input torque, therefore, the impact of load changes should preferably be cushioned especially well.

SUMMARY OF THE INVENTION

Based on this state of the art, the invention has the objective of improving the initially described state of the art coupling so that within the design range of the coupling, for relatively high torques and correspondingly large twisting angles, any load changes at larger torques are handled more elastically over a larger twisting angle, i.e., by enlarging the effectively utilizable twisting angle range.

This objective is achieved by the invention because of the fact that the bearing plate of the coupling is itself employed as a centrifugal weight or is developed to be firmly connected with a centrifugal weight.

The bearing plate can be developed as a centrifugal weight by simply using, instead of the bearing plate made of steel plate, a relatively thick and heavy casting as the "bearing plate" which actually should no longer be called a "bearing plate" but rather a "bearing". However, in order to make the terminology of the present invention as clear as possible, this development of the bearing in the following will be called a "bearing plate" that is developed as a centrifugal weight.

As an alternative, the bearing plate may also be developed as a centrifugal weight by connecting a steel plate serving as the bearing, thus a real "bearing plate", firmly coupled with the centrifugal weight, for example by riveting, soldering or welding it to a heavy metal casting.

During the operation of the torsionally elastic coupling according to the invention, the development of the bearing plate as a centrifugal weight has the result that the bearing for the coupling link is forced radially toward the outside with increasing centrifugal force as the rotational speed of the coupling rises. This will then result in a relief of the spring link and thus in a reduction of the restoring force required for compensating the effective torques and for producing the balance of the torques. This will also result in a reduced deflection of the spring link and thus in a reduction of the angle of relative twist between the two halves of the coupling that adjusts itself to a certain torque. In other words, with a constant twisting angle and an increasing rotational speed, an increasingly large torque can be cushioned softly in a uniform manner or, from an alternative perspective, the angle of rotation that is available for the torsionally elastic cushioning at a constant torque becomes larger as the rotational speed of the coupling increases, since the occurring equilibrium twisting angle becomes smaller because of the relief of the spring link. Thus impacts of load changes, in the case of the coupling according to the invention, at relatively high torques, twisting angles and speeds of rotation, can be cushioned much more softly in a torsionally elastic manner than is possible in the case of the coupling of the state of the art.

According to the development of the invention, the motion-changing link preferably is an eccentric link or a crank and the coupling link preferably is a rigid connecting rod or coupling rod. In this case, the bearing journal or the bearing pin by means of which the coupling link is coupled to the bearing plate developed as a centrifugal weight at least on one side, but preferably on both sides is precisely radially guided in a slot-shaped oblong hole which is developed in a side plate of the coupling or in two side plates of the coupling. The side plates may be retaining elements, covering elements, parts of the centering plate or parts of the support plate for the lining. These plates, in addition, may contain a guide for the bearing plate in the way of an analogous journal—oblong hole guide. Such slot guides ensure a completely symmetrical distribution of forces in the coupling and thus also ensure a maximum amount of suppression of problems due to unbalanced mass. These oblong hole guides in the side plates, as required, are either designed to be so long that they are at least as long or slightly longer than the distance that the bearing journal or the bearing pin of the coupling link moves in the case of a twisting angle of the coupling of 180°. They may be shorter than this distance, according to an indicated maximally admissible twisting angle of the coupling, where the torsionally elastic force-locking connection of the two halves of the coupling is to be replaced by a rotational rigid form closure and an inflexible force locking.

According to another development of the invention, the spring elements are preferably prestressed by being compression clamped between the bearing plate (developed as the centrifugal weight) and the support of the first half of the coupling. This, as is easily understood, results in the fact that the characteristic torque/twisting angle curve starts higher, which is desirable in many fields of application, especially in motor vehicle construction.

The particularly torsionally soft, torsionally elastic coupling according to the invention is preferably used in motor vehicle construction, namely in the drive system, especially in the drive line between the driver plate and the output shaft of a separator coupling or as a damper or eliminator, especially a low-frequency eliminator.

BRIEF DESCRIPTION OF THE DRAWING

In the following, the invention is explained in detail by means of drawings.

FIG. 1 is a lateral, partially sectional view taken through a radial plane of an embodiment of the coupling having a bearing plate that is developed as a centrifugal weight;

FIG. 2 is a section according to II—II in FIG. 1; and

FIG. 3, as a parametric representation, is a family of characteristics for the embodiment shown in FIGS. 1 and 2 of the torsionally elastic coupling.

DETAILED DESCRIPTION OF THE INVENTION

An embodiment of the torsionally elastic coupling shown in FIGS. 1 and 2 is designed as part of a separator coupling. The coupling includes a first half 1 and a second half 2 connected together with links in a torsionally elastic force-locking manner. The two halves 1, 2 of the coupling are arranged coaxially and at least essentially coplanar with respect to one another so that the second half of the coupling, located radially inward from the first half, is enclosed by the first half of the coupling.

The first half 1 of the coupling has a centering and covering plate 3 arranged on one side thereof. On the axially opposite side is provided a centering and covering lining-support plate 4, peripherally and firmly connected to plate 3 with rivets 5. In a conventional manner, the lining-support plate 4 has friction lining disks 6 at its outer periphery.

The centering plate 3 and the lining-support plate 4 are both axially coupled in a relatively rotatable manner to the inside half 2 of the coupling developed as the hub of the coupling. Connection on each side occurs by means of a snap ring 7 engaging a snap ring groove formed in the hub. A floating shim 8 and a friction disk 9 complete axial mounting of the lining support plate 4.

Although not shown in FIG. 2, the centering plate 3 may also be fixed in the same manner.

The second half 2 of the coupling that functions as the hub, in the conventional manner, is provided with an internal toothing 10 by means of which, it can be fixed on an assigned shaft in a rotationally stable manner.

In the embodiment of the torsionally elastic coupling described herein, the torsionally elastic connection of the two halves 1, 2 of the coupling with one another takes place via two force guiding paths that are parallel and symmetric with respect to one another. For reasons of clarity, only one of the two force guiding paths will be explained in detail below.

An eccentric disk 11 is mounted in a rotationally stable manner to the second half of the coupling and in the present case is formed as one piece with that half. The eccentric disk 11 is received, via a roller bearing 12, within a lower connecting rod eye of a connecting rod 13 serving as the coupling link. The head 14 of the connecting rod, with its opposite eye, is in turn coupled with a connecting rod pin 15 to a bearing portion 16 of a bearing plate 17. The bearing plate, in a molded-on manner, rests on two elastomer spring assemblies 18', 18" that are symmetrical with respect to one another and that jointly, as parts of an interacting rubber spring, form the spring link 18 of the torsionally elastic coupling. This spring link 18 forming an elastomer spring is supported on a web 19 which, with rivets 20, is firmly connected with the centering plate 3 and the lining-support plate 4, and is therefore firmly connected with the first half 1 of the coupling. Being prestressed by compression, the elastomer spring is clamped between the bearing plate 17 and the web 19, with the bearing plate 17 resting against stops of the first half 1 of the coupling.

An elongate hole or opening 24 is formed in each of the lining-support plate 4 and centering plate 3 to receive the connecting rod bearing pin 15 which is longer than the separation between the centering plate 3 and the lining-support plate 4 (FIG. 2). The axial fixing of the connecting rod bearing pin 15, in the embodiment shown here, takes place by means of snap rings fitted to opposite ends of the pin outside plates 3, 4.

Each hole 24 is aligned precisely radially and serves as the guide slot for the connecting rod bearing pin 15. In the present embodiment, the radial outer end 25 of hole 24 is positioned so that it is located on the radial center line of the coupling symmetrically between the two elastomer part spring assemblies 18', 18", and when the bearing plate 17 strikes the first half 1 of the coupling, can just barely without striking against it receive the connecting rod bearing pin 15. The opposite and radial inner end 26 of hole 24 is located just slightly radially inward from the point representing the innermost radial position of the connecting rod bearing pin 15 when the twisting angle of the two halves of the coupling with respect to one another is 180°. When the maximum possible twisting angle of the coupling, for example, for reasons of safety, is to be limited to a lower value by form closure, the radial inner end 26 of the hole 24 is moved radially outward by a corresponding amount, i.e., the length of the hole 24 is therefore shortened.

When there is twisting of the first half 1 of the coupling relative to the second half 2 of the coupling, the eccentric 11 is twisted out of the zero position shown in FIGS. 1 and 2 according to the direction of rotation of the second half 2 of the coupling, i.e., clockwise or counter-clockwise. In both cases, this results in a shortening of the radial distance between the center line 22 of the second half of the coupling and the center line 23 of the connecting rod bearing pin 15. Radially inward movement of the connecting rod bearing pin 15 in this case occurs without any tangential component since the connecting rod bearing pin 15 is guided precisely radially in the hole 24. By means of this radially inward shifting of the connecting rod bearing pin 15, in the representation of FIGS. 1 and 2, the bearing plate 17 is also forced downward against the restoring force of the prestressed elastomer spring 18 which is compressed further as the introduced work, i.e., work done by the applied torque, is stored. This introduction of the compression work into the spring link 18, in this case, takes place by the guidance of the connecting rod bearing bolt 15 in the oblong hole 24 in both elastomer part springs 18', 18" with an absolutely symmetrical distribution, and thus without any transverse force. This again not only leads to a prolonged useful life of the elastomer spring but mainly also to an elimination of any unbalanced mass of the coupling, especially in the case of high rotational speeds. When the half of the coupling on the input side is acted upon by a torque, the deflection work introduced in this manner into the elastomer spring is stored by the elastomer spring long enough for the torques affecting the two halves of the coupling to be balanced. In other words, until dynamic equilibrium of torques occurs between the input half and the output half of the coupling, the rotational inertia of the output half of the coupling causes energy to be stored by means of work done by the input half of the coupling in producing deflection of the elastomer spring 18. It can be recognized that it does not matter in this case whether the outer half 1 or the inner half 2 of the coupling is the input half or the output half of the coupling. The function of the coupling in both cases is identical. In both cases, the connecting rod bearing pin 15 is guided strictly radially through the hole 24. In both cases only the relative twisting angle of the two halves 1, 2 of the coupling with respect to one another is decisive and therefore not dependent on the rotating direction and not depending on the direction of the torques.

As shown especially in FIG. 1, the bearing plate 17 is formed as a relatively thick and heavy casting or forged piece so that the bearing plate as a whole, because of its considerable mass, acts as a centrifugal weight. The pulling-down of the bearing plates 17 toward the center of the coupling that is caused during introduction of work into the coupling by a twisting of the halves 1 and 2 of the coupling with respect to one another is counteracted by the radially outward centrifugal force to achieve a reduction of the twisting angle which is caused by the centrifugal mass of the bearing plates 17, said twisting angle in each case occurring in the equilibrium of torques. How large the adjusting twisting angle will finally be, in the case of the indicated characteristics data of the spring link, can be adjusted very simply by appropriate dimensioning of the inert mass of the bearing plate 17. By an adaptation of the centrifugal mass of the bearing plate 17, of the characteristic spring data of the spring link 18 and of the eccentricity relationships of the eccentric 11 as well as the length and the coupling points of the connecting rod 13, the coupling that is constructed in such a way can be tuned as finely as required with practically any characteristic curves. One with ordinary skill in the art using these means has sufficient possibilities in any individual case to achieve an optimal adaptation of the characteristic curves to each specific application. For use of the softly twistable torsionally elastic coupling shown in FIGS. 1 and 2 for motor vehicle construction, the family of characteristic curves is shown in FIG. 3, namely the twisting angle/rotational speed family of characteristic curves in the representation with the constant torque as the parameter.

FIG. 3 shows clearly that with the bearing plate employed as a centrifugal weight, the twisting angle that adjusts itself in the equilibrium of torques for a certain torque becomes smaller with increasing rotational speed because of the relief of the spring link 18 under the effect of the centrifugal force that is applied by the centrifugal mass of the bearing plate 17. Thus, in the equilibrium of torques, for example, when the rotational speed of the coupling is 1000 r.p.m. with a transferred torque of 50 Nm, a twisting angle of the two halves 1, 2 of the coupling with respect to one another of about 70° will occur. In contrast, with a rotational speed of 5000 r.p.m., the twisting angle under otherwise identical conditions is practically only 0°, and the coupling is therefore under the effect of the centrifugal masses practically turned back to its zero relative twist position.

Vice versa for a twisting angle of about 70°, at a rotational speed of 1000 r.p.m., in the equilibrium of torques, a torque of 50 Nm can be transferred, whereas double this torque, namely a torque of 100 Nm, can be transferred at a rotational speed of about 5500 r.p.m. With an increase in the twisting angle the compression of the spring-elastic link becomes larger, and the characteristic torque/twisting angle curve becomes increasingly harder, and therefore steeper. This means that for an indicated amount of torque load change at torque of 100 Nm and a rotational speed of 5500 r.p.m., the same twisting angle change and therefore the same rotational elasticity is available as at a rotational speed of only 1000 r.p.m. for a torque of 50 Nm, which is only half as large a torque. The coupling therefore in the range of higher numbers of rotations and higher loads, and thus higher torques, exhibits a larger twisting softness with respect to impacts of load changes than the coupling according to the state of the art where the bearing plate 17 with a negligible mass is produced of a relatively thin steel plate.

These relationships can be taken directly from FIG. 3. Thus, for example, at a rotational speed of 1000 r.p.m., for the absorption of a torque load change of 100 Nm to 150 Nm, a twisting angle change of about 25° is available. At a rotational speed of 6000 r.p.m., however, for the same load change impact, a change of the twisting angle of about 45° is available. Therefore the coupling that is described here as the preferred embodiment, reversing the conditions of the coupling of the state of the art, at higher speeds is even more softly twistable at lower speeds. In this case, one with ordinary skill in the art will recognize immediately that he can easily also adapt the conditions in such a way that the coupling over the whole rotating number range has a practically constant twisting elasticity. As explained above, such adaptations of the coupling or such adjustments of the family of characteristic curves can be carried out by the most simple means adapted to the individual application, by one with ordinary skill in the art.

1. A torsionally elastic coupling for transmitting torque between input and output members comprising coaxial first and second coupling plates (1, 2) respectively connected to said output and input members; at least one spring link connected between said coupling plates, said plates being twistable with respect to one another through said spring link (18); at least one motion-changing link (11) connected to transmit force between said first and second coupling plates through said spring link; at least one bearing plate (17) positioned in contact with said spring link (18) and connected with the first coupling plate, wherein said motion-changing link (11) is coupled to the bearing plate (17) so that when rotation of the second coupling plate relative to the first coupling plate occurs, said bearing plate moves radially as a result of said motion-changing link rotating with the second coupling plate to selectively tighten or relax said spring link (18) depending on the rotational direction of said second coupling plate, wherein said bearing plate (17) is formed as a thick and heavy centrifugal weight (17) having an inert mass, said centrifugal weight being dimensioned so that as input load changes increase as a function of rotational speed of said input member, said coupling exhibits a progressively increasing twisting softness caused by centrifugal movement of the bearing plate as a result of the mass of the centrifugal weight bearing plate so that an angle of twist between said first and second coupling plates progressively increases for a predetermined load change as a function of increasing rotational speed.

2. A torsionally elastic coupling according to claim 1, wherein said motion-changing link is an eccentric disk (11), and further including a coupling link having a rigid connecting rod (13) connecting the eccentric disk to the bearing plate.

3. A torsionally elastic coupling according to claim 2, further including a side plate (3, 4) connected to the first coupling plate (1) and means for connecting said at least one spring link (18) to the first coupling plate in a torsionally stable manner, said side plate including a radially aligned elongate guide slot (24) and a bearing journal (15) extending through the guide slot to connect said coupling link (13) to said bearing plate (17) and thereby transmit the translatory output of the motion-changing link (11) to said bearing plate.

4. A coupling according to claim 3, wherein the length of said guide slot (24) is at least equal to a length of the path that the bearing journal (15) traverses through the guide slot (24) when the two coupling plates of said coupling twist with respect to each other from 0° to 180°.

5. A coupling according to claim 3, wherein an end (25) of the guide slot (24) is arranged to receive the bearing journal (15) in the zero position of the coupling, so that when the twisting angle of the first and second coupling plates of the coupling with respect to each other is 0°, the pin just barely strikes said end to produce a slight stop motion, an opposite end (26) of the guide slot (24) being located so that the bearing journal strikes said opposite end before the twisting angle of the coupling is 180°.

6. A torsionally elastic coupling according to claim 5, further including a plurality of said spring links, wherein at least one of the spring links (18), while being prestressed by compression, is clamped between said bearing plate (17) and a support (19) connected to the first coupling plate (1).

7. A torsionally elastic coupling according to claim 6, wherein said coupling link is a tension-proof bendable brace being tensionally elastic to a limited extent.

8. A torsionally elastic coupling according to claim 6, wherein the motion-changing link and the coupling link are connected to each other so that the spring link, during twisting of the first and second coupling plates relative to each other, is acted upon by a compressive force.

9. The coupling according to claim 8, wherein said coupling is mounted in a motor vehicle within a drive system thereof, between a driver plate and an output shaft of a separator coupling.

10. The coupling according to claim 8, wherein said coupling is mounted in a motor vehicle as a low frequency oscillation damper or eliminator.

11. The coupling of claim 1, wherein said bearing plate is thicker at innermost portions thereof proximate the bearing journal and thinner at outer ends of the bearing plate.

* * * * *